United States Patent
Calhoun et al.

(10) Patent No.: US 7,602,746 B2
(45) Date of Patent: Oct. 13, 2009

(54) METHOD FOR OPTIMIZED LAYER 2 ROAMING AND POLICY ENFORCEMENT IN A WIRELESS ENVIRONMENT

(75) Inventors: Patrice R. Calhoun, Pleasanton, CA (US); Nancy Cam-Winget, Mountain View, CA (US); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 11/315,861

(22) Filed: Dec. 21, 2005

(65) Prior Publication Data

US 2007/0104126 A1 May 10, 2007

Related U.S. Application Data

(60) Provisional application No. 60/734,002, filed on Nov. 4, 2005.

(51) Int. Cl.
*G06F 15/00* (2006.01)
(52) U.S. Cl. .................................. 370/328; 455/450
(58) Field of Classification Search ............ 455/414.1, 455/41.2, 410, 411, 461, 550.1, 551, 561, 455/450; 370/338, 328
See application file for complete search history.

(56) References Cited

U.S. PATENT DOCUMENTS 7,302,255 B1 * 11/2007 Lundy et al. ............ 455/414.1
7,359,348 B2 * 4/2008 Uedo ...................... 370/329
2003/0053437 A1  3/2003 Bahl et al.
2004/0185845 A1  9/2004 Abhishek et al.
2005/0060319 A1  3/2005 Douglas et al.
2005/0138178 A1 * 6/2005 Astarabadi .............. 709/227
2005/0243717 A1 11/2005 Stieglitz et al.

OTHER PUBLICATIONS

Notification of Transmittal of the International Search Report and The Written Opinion of the International Searching Authority, or the Declaration, mailed from the International Searching Authority on Dec. 5, 2007.
Dan Simone, 802.11k makes WLANs measure up, Networkworld. com, Mar. 29, 2004, http://www.networkworld.com/news/tech/2004/0329techupdate.html.
Fanny Mlinarksy, Metrics and Methods Bring VoWLAN Success, wsdmag.com, Mar. 2005, http://www.wsdmag.com/Articles/Print.cfm?ArticleID=10003.

* cited by examiner

Primary Examiner—Sam Bhattacharya
(74) Attorney, Agent, or Firm—Baker Botts L.L.P.

(57) ABSTRACT

Methods, apparatuses, and systems directed to facilitating the application of pre-allocation policies in a wireless network environment. According to one implementation of the present invention, a central controller, or other control point in a wireless network infrastructure, applies one or more policies that limit the number of resource pre-allocations a given wireless client may establish with one or more wireless access points. In one implementation, the central controller provides a pre-allocation list to a wireless client that is requesting pre-allocation. By limiting a wireless client's ability to pre-allocate resources, the central controller optimally manages the resources of the wireless network. In alternative embodiments, the central controller can terminate pre-allocations between a wireless client and one or more wireless access points to enforce pre-allocation policy on the wireless network infrastructure.

32 Claims, 13 Drawing Sheets

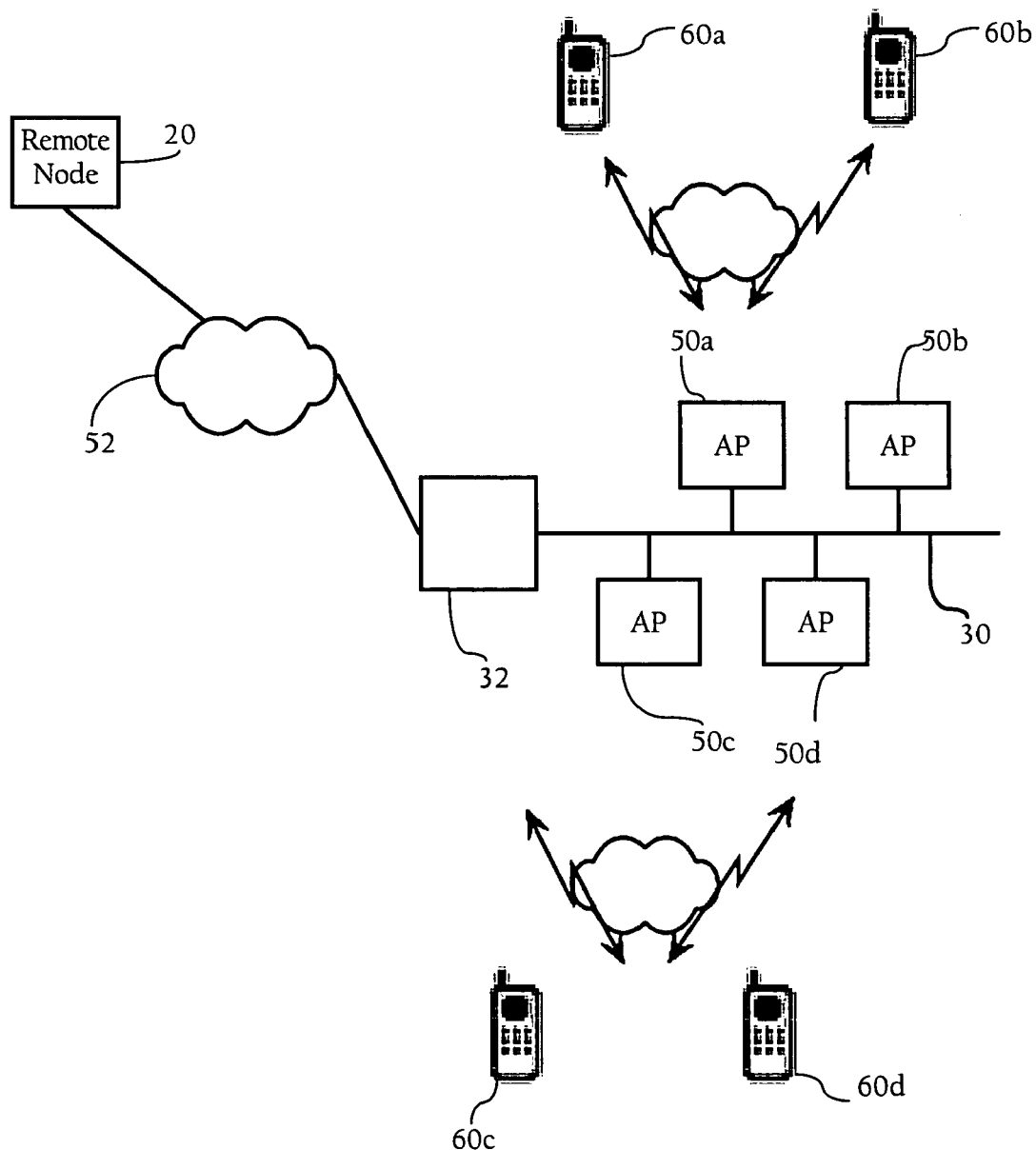
Fig._1A

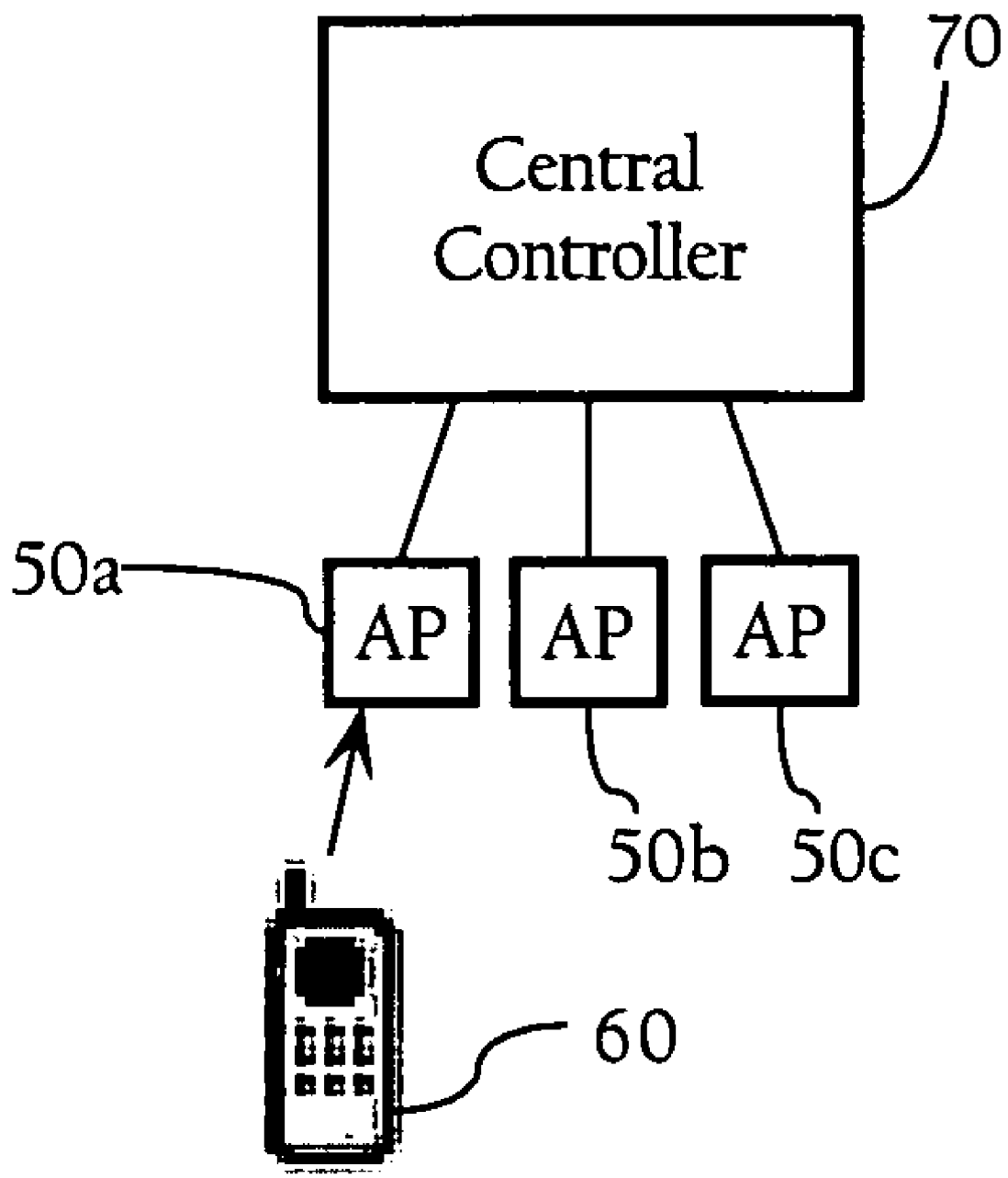
Fig._1B

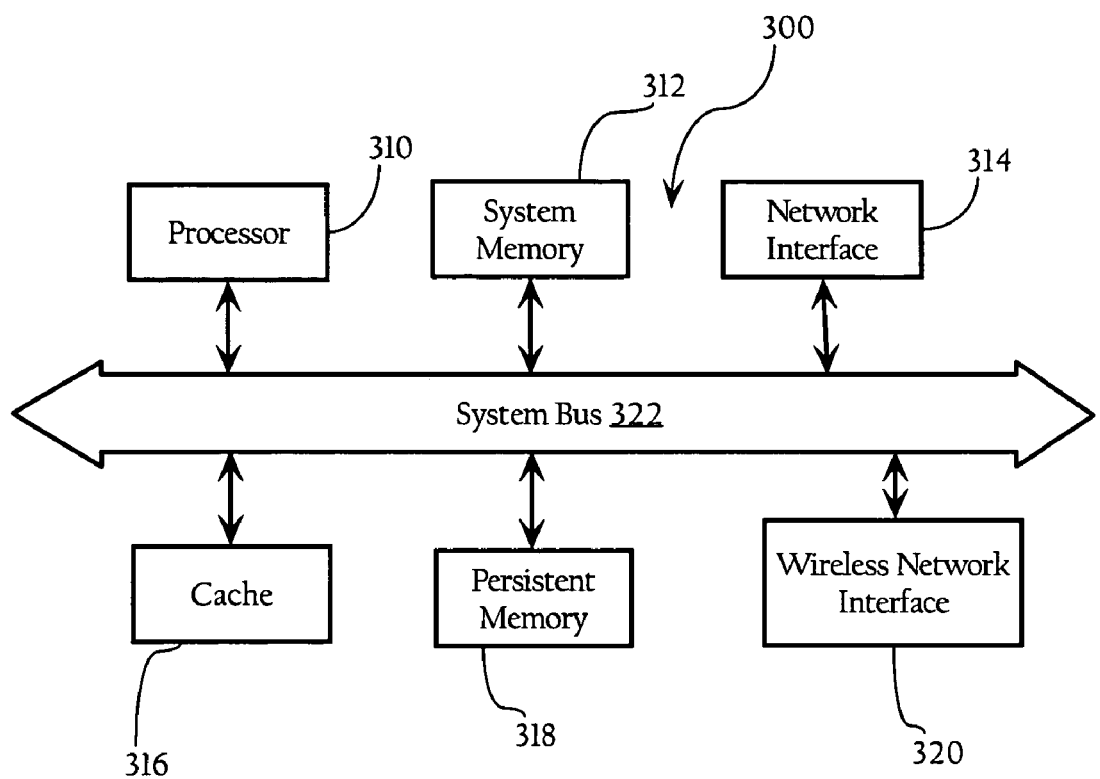
Fig._2

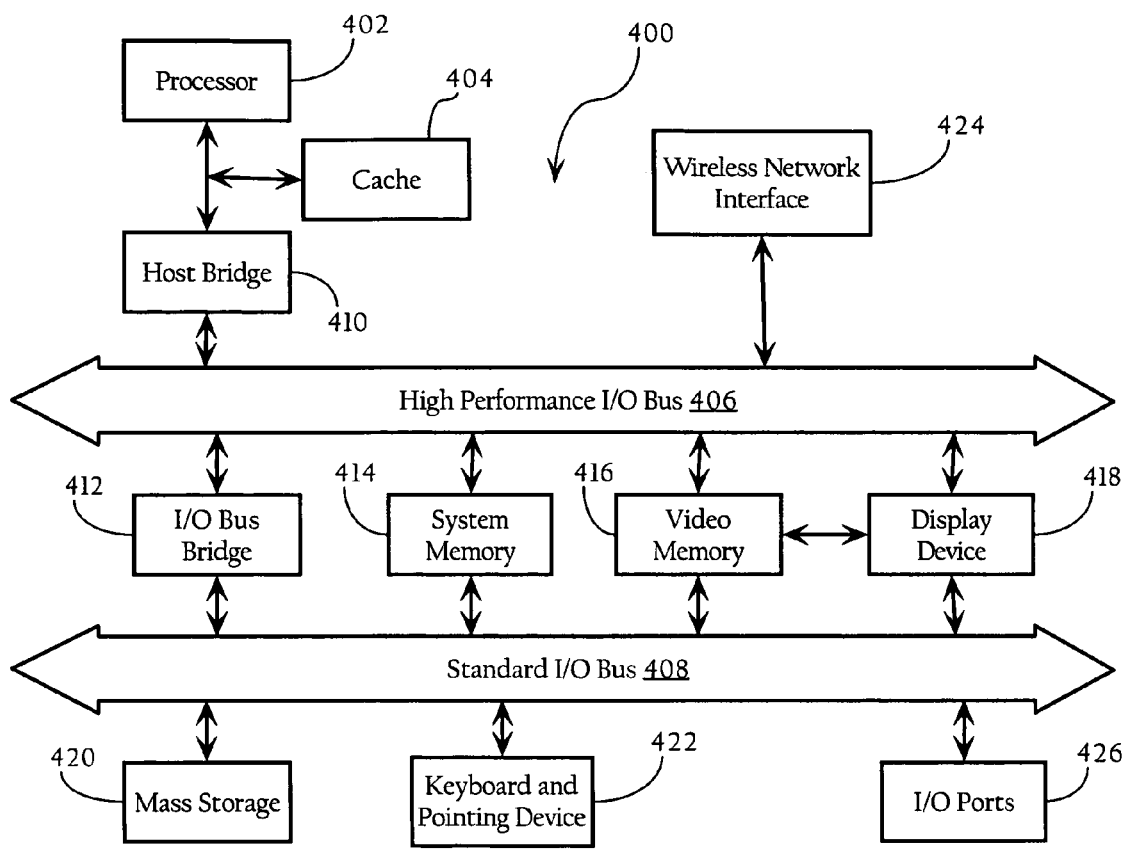
Fig._3

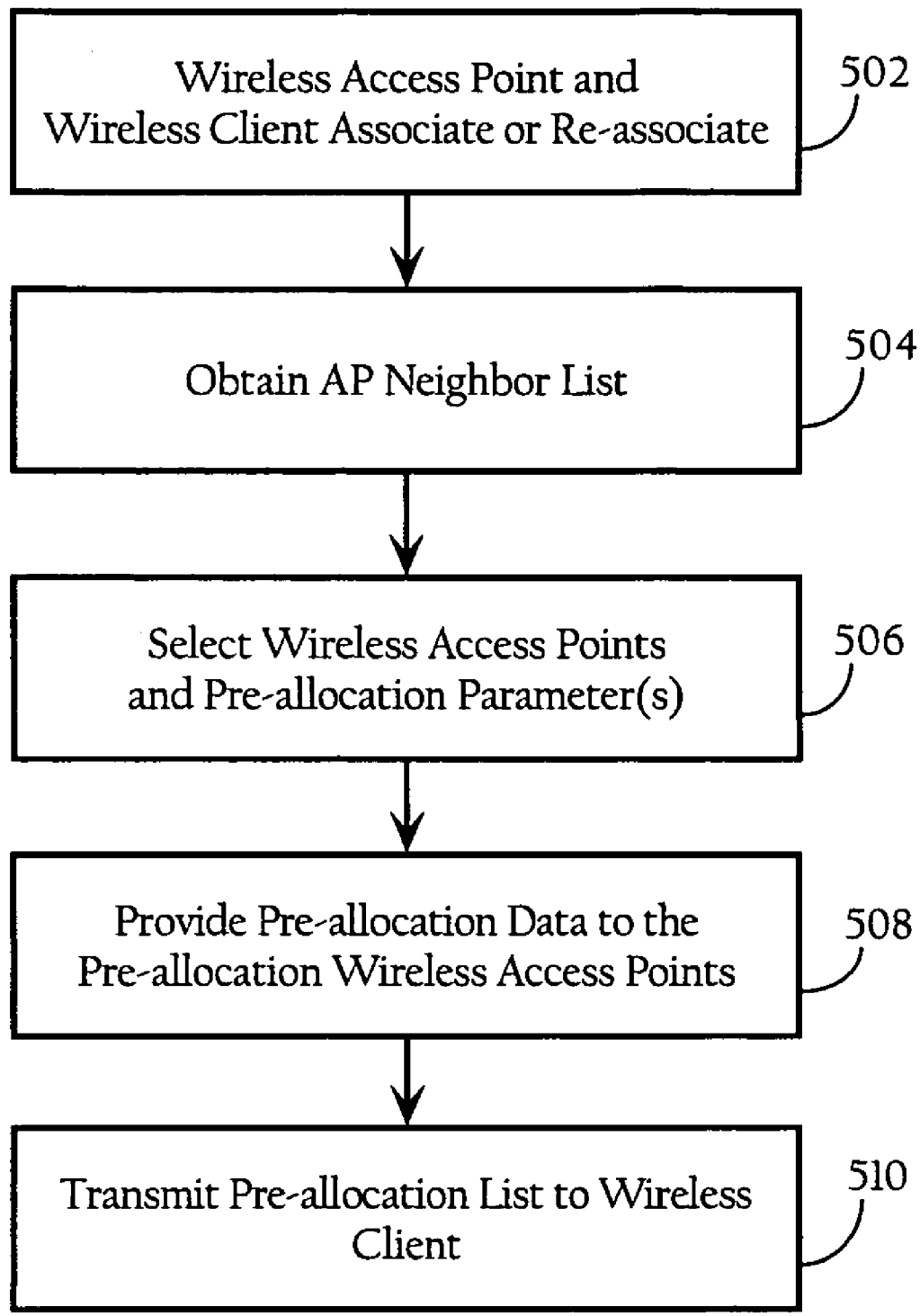
Fig._4A

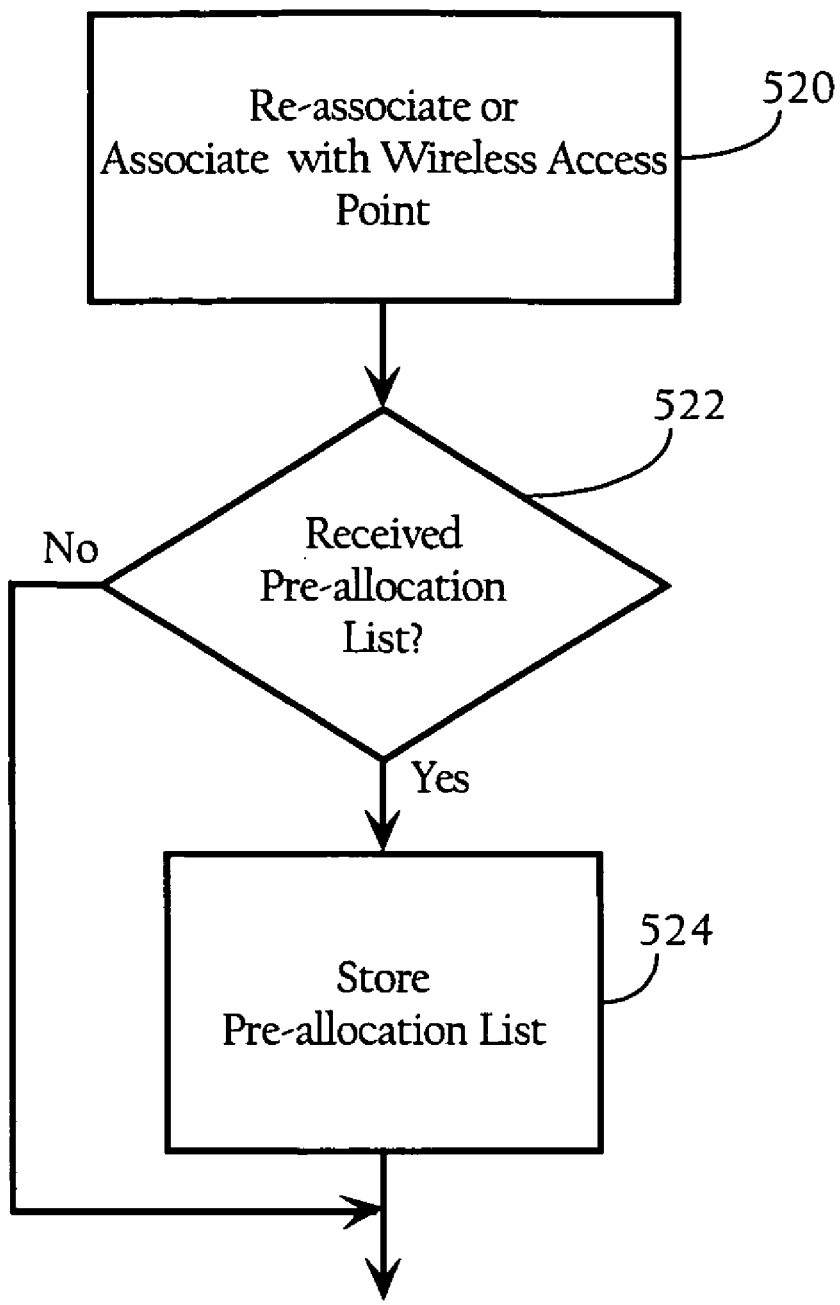
Fig._4B

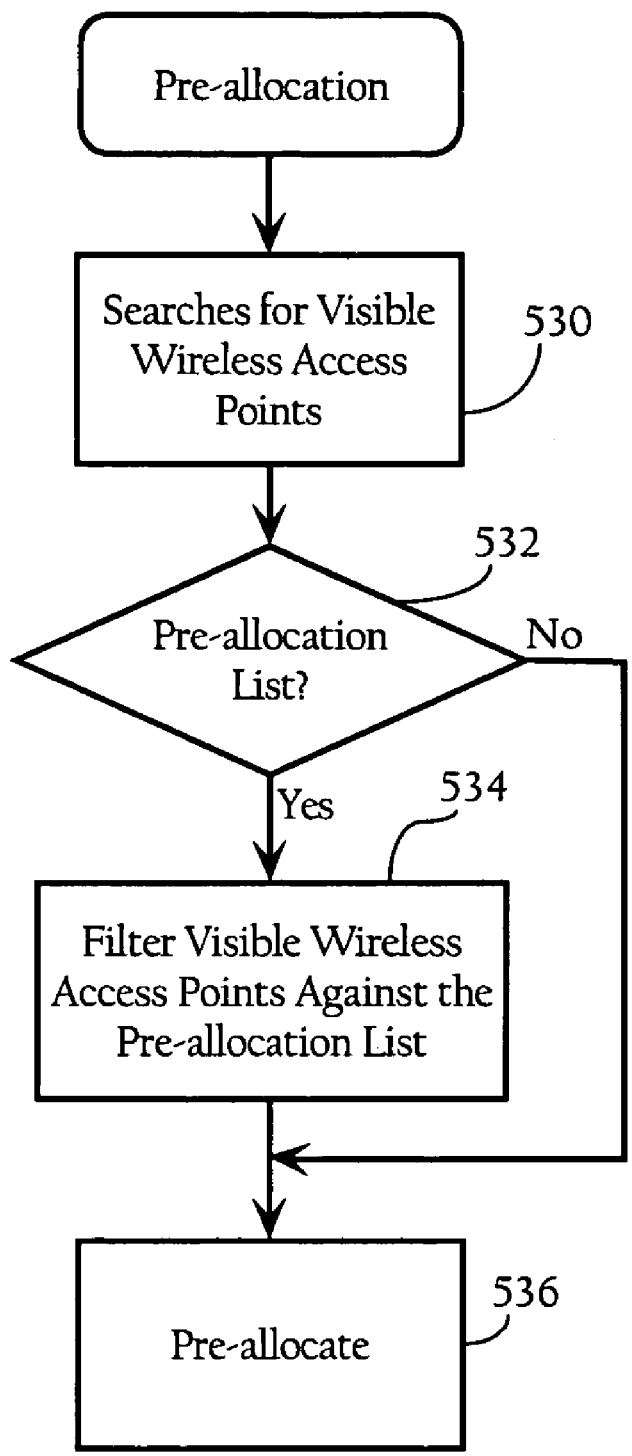
Fig._4C

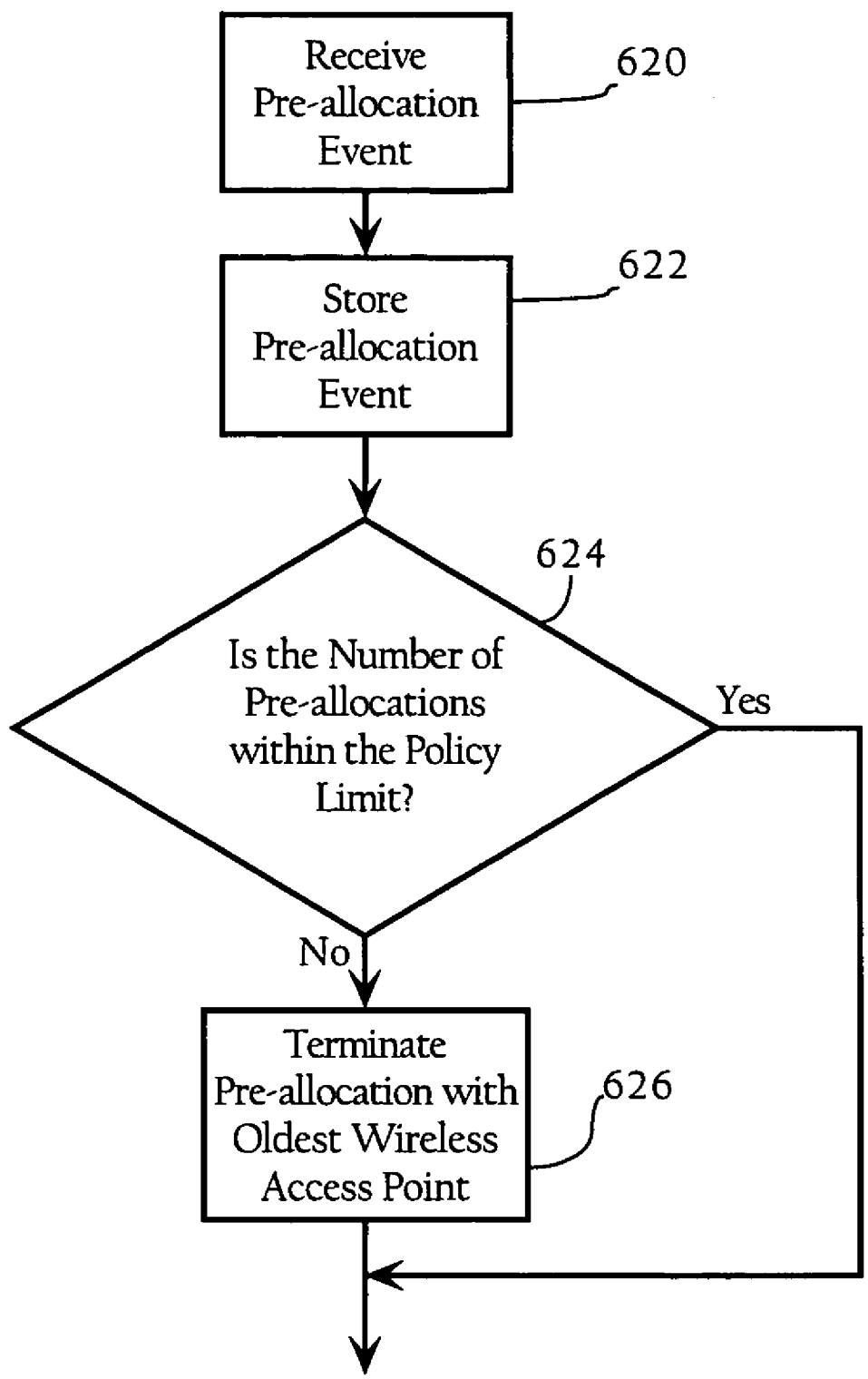
Fig. _5B

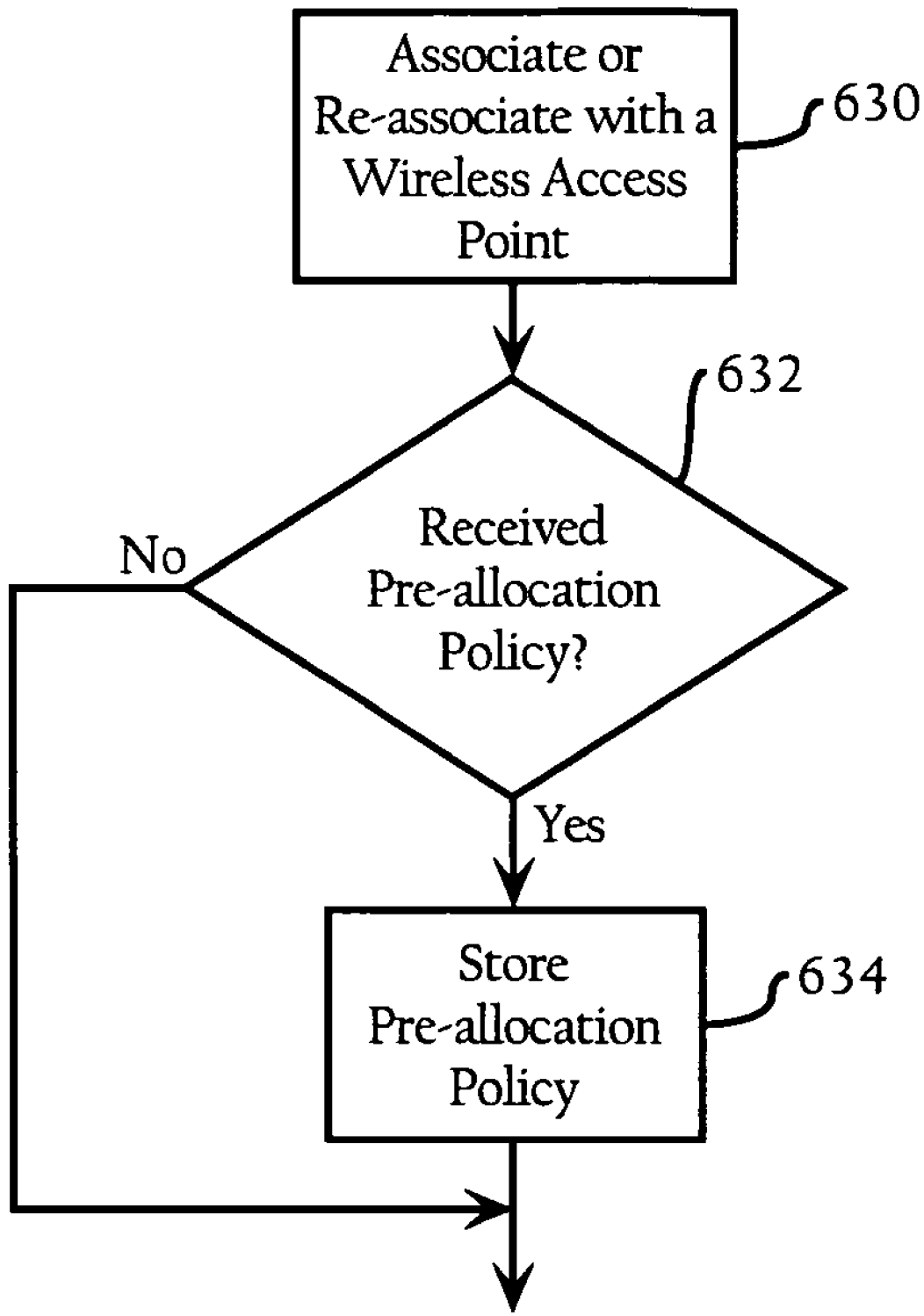
Fig._5C

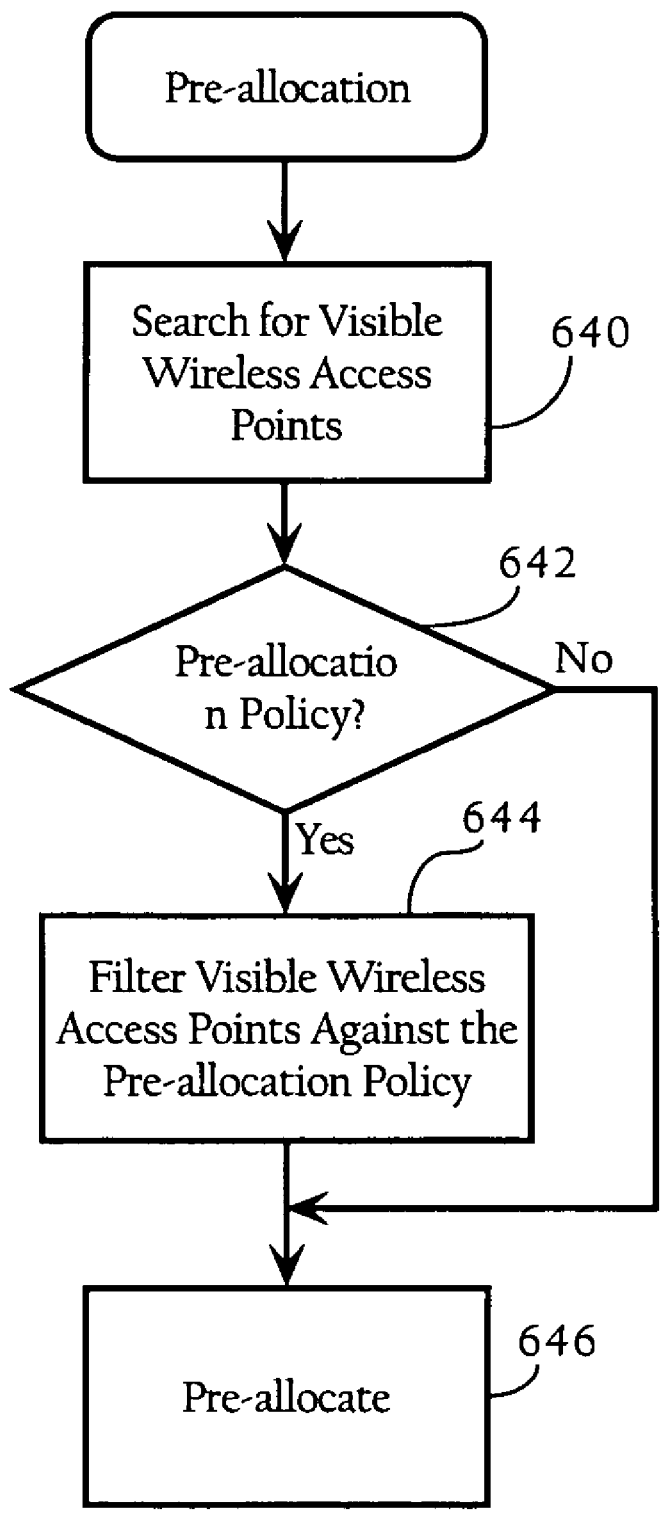
Fig._5D

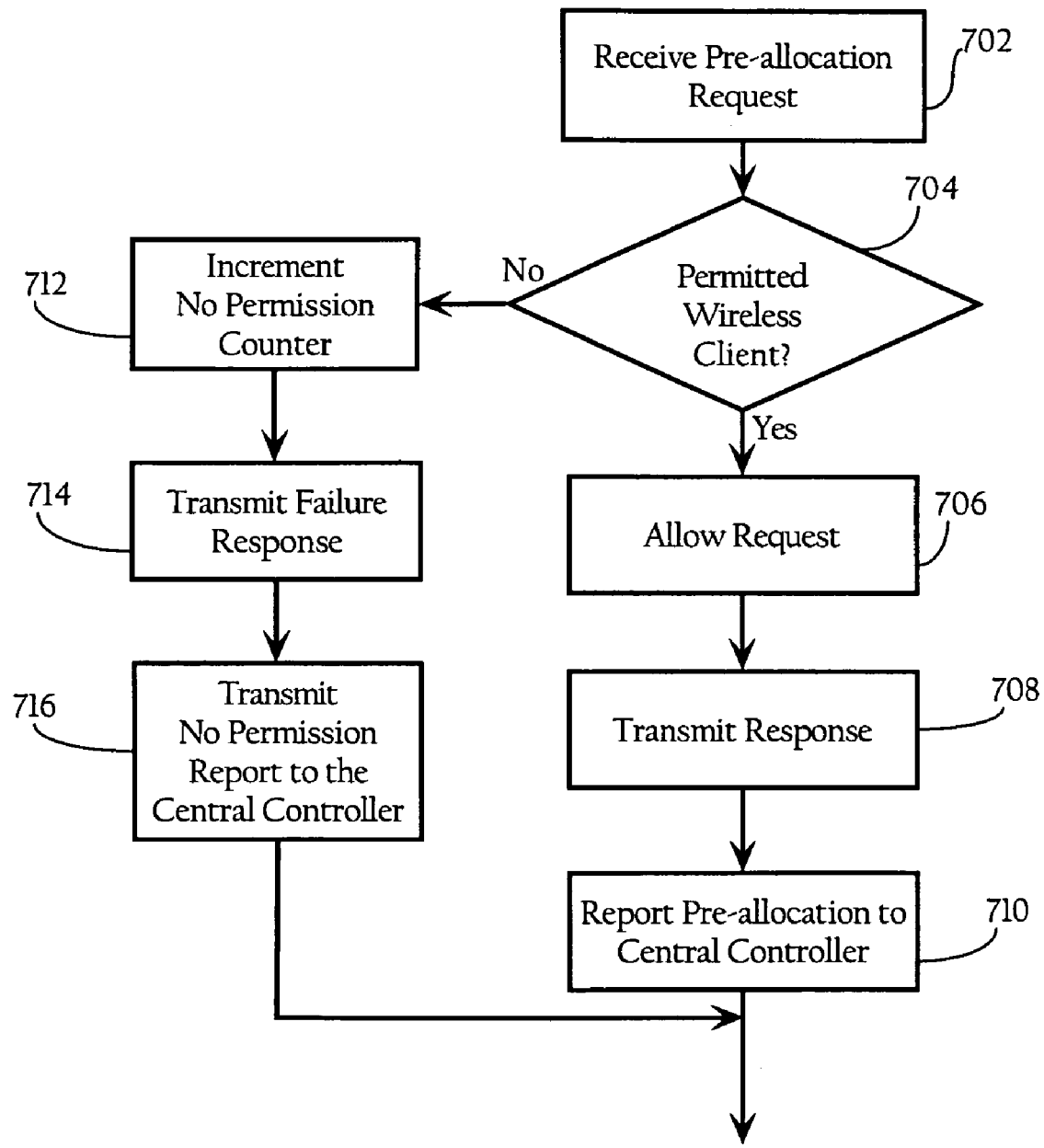
Fig._6

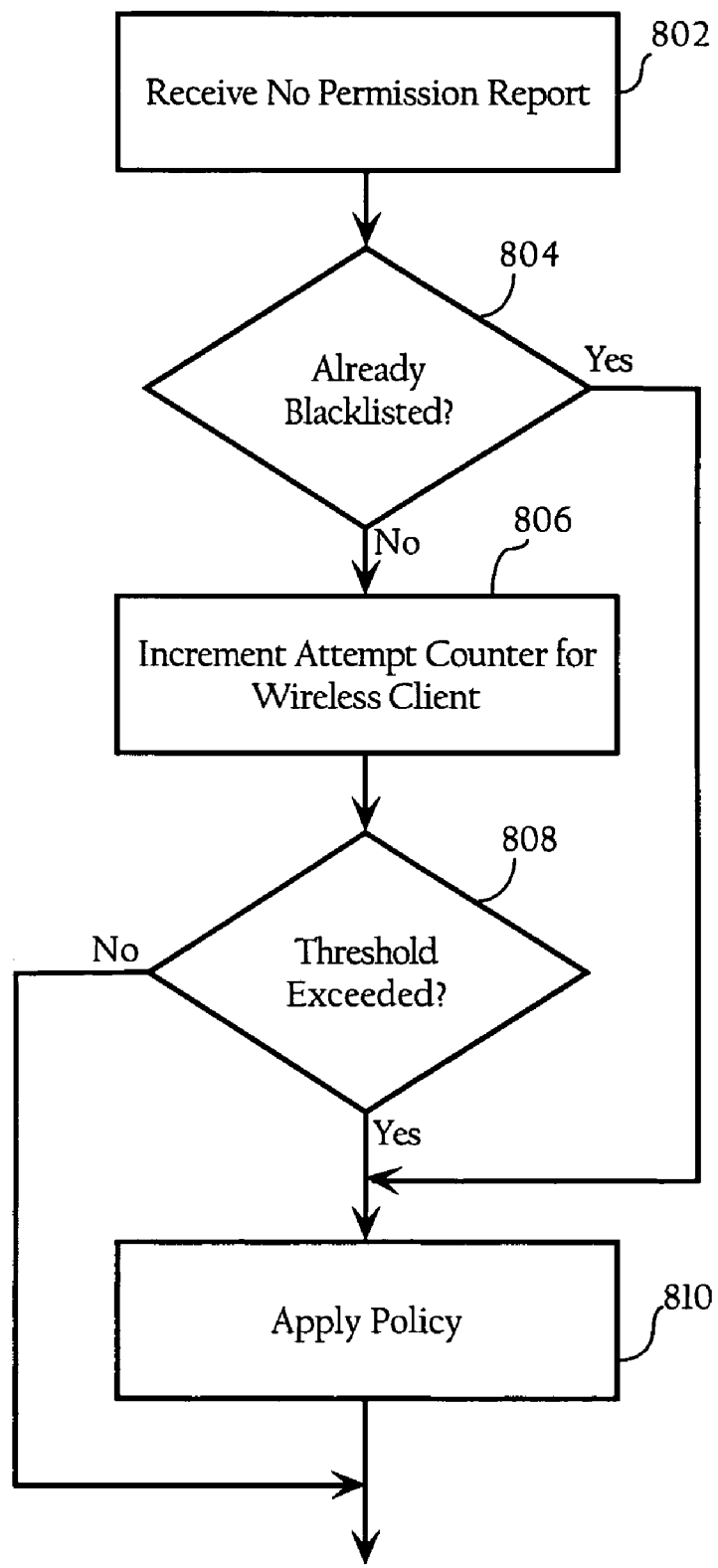
Fig._7

METHOD FOR OPTIMIZED LAYER 2 ROAMING AND POLICY ENFORCEMENT IN A WIRELESS ENVIRONMENT

CROSS-REFERENCE TO RELATED APPLICATIONS AND PATENTS

The present application claims priority to U.S. Provisional Application Ser. No. 60/734,002, filed Nov. 4, 2005, entitled "Method for Optimized Layer 2 Roaming and Policy Enforcement in a Wireless Environment," which is incorporated by reference herein for all purposes. This application also makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 11/195,536 in the name of Brian Cox, Bruce McMurdo and Anuradha Gade, entitled "Method and System for Dynamic Assignment of Wireless LAN Access Point Identity."

FIELD OF THE INVENTION

The present invention relates to wireless networks and, more particularly, to methods, apparatuses, and systems directed to facilitating roaming policy enforcement in a wireless network environment.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Wireless clients may often roam among several wireless access points during a session (such as a VoIP over WLAN session). To minimize service disruptions during roam events, roaming standards such as IEEE 802.11k and 802.11r are being defined. 802.11r, for example, refines the transition process of a wireless client as it roams from one wireless access point to another. The protocol allows a wireless client to pre-establish a security and quality of service (QoS) state at a new wireless access point before making a transition, which minimizes connectivity loss and network application disruption.

As a wireless client roams, the wireless client may attempt to reserve or "pre-allocate" resources (e.g., security and QoS resources) of one or more wireless access points in the wireless network. Pre-allocating resources optimizes transitions as receiving wireless access points already have resources reserved or pre-allocated for the wireless client before arrival. Roaming standards such as IEEE 802.11k and 802.11r allow for a wireless client to acquire information about network capabilities through radio measurements, potential roaming neighboring basic service set identifiers (BSSIDs), and ultimately the pre-allocation of required services. While mechanisms for pre-allocating resources such as security and QoS resources are being defined, there are no specific means for managing such pre-allocation mechanisms and their impact on the network infrastructure. For example, pre-allocation essentially commits resources of a wireless access point that would otherwise be available to other wireless clients. As the number of wireless clients and load on the WLAN increases, available resources can be quickly depleted.

In light of the foregoing, a need in the art exists for methods, apparatuses, and systems that address the foregoing problems and facilitate roaming and pre-allocation policy enforcement in a wireless environment. Embodiments of the present invention substantially fulfill this need.

DESCRIPTION OF THE DRAWINGS

FIG. 1A is a topological diagram of the components in a wireless local area network (WLAN) system according to one embodiment of the present invention.

FIG. 1B illustrates a central controller 70, which may be used to manage the pre-allocation of resources of the wireless network infrastructure.

FIG. 2 illustrates for didactic purposes a hardware system, which can be used to implement a wireless access point.

FIG. 3 illustrates for didactic purposes a hardware system, which can be used to implement a wireless client.

FIG. 4A is a flow chart illustrating a process flow, according to one implementation of the present invention, associated with providing a pre-allocation list to a wireless client.

FIG. 4B is a flow chart illustrating a process flow, according to one implementation of the present invention, implemented at a wireless client.

FIG. 4C is a flow chart illustrating a process flow, according to one implementation of the present invention, implemented at a wireless client.

FIG. 5B is a flow chart illustrating a process flow, according to one implementation of the present invention, implemented at a central controller.

FIG. 5C is a flow chart illustrating a process flow, according to one implementation of the present invention, implemented at a wireless client.

FIG. 5D is a flow chart illustrating a process flow, according to one implementation of the present invention, implemented at a wireless client.

FIG. 6 is a flow chart illustrating a process flow, according to one implementation of the present invention, implemented at a wireless access point.

FIG. 7 is a flow chart illustrating a process flow, according to one implementation of the present invention, implemented at a central controller.

DESCRIPTION OF PREFERRED EMBODIMENT(S)

A. Overview

Figure 5A:
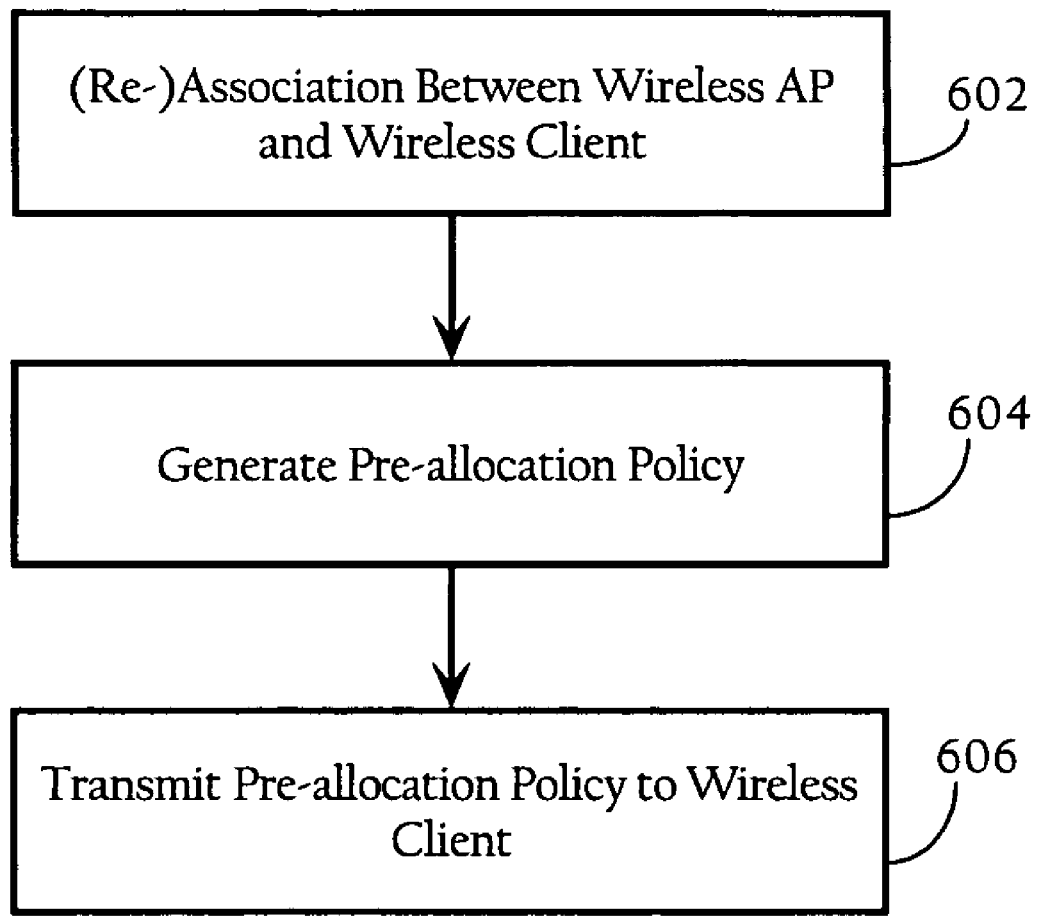
FIG. 5A is a flow chart illustrating a process flow, according to one implementation of the present invention, directed to applying pre-allocation policy for a wireless network infrastructure.

The present invention provides methods, apparatuses, and systems directed to facilitating the application of pre-allocation policies in a wireless network environment. According to one implementation of the present invention, a central controller, or other control point in a wireless network infrastructure, applies one or more policies that limit the number of resource pre-allocations a given wireless client may establish with one or more wireless access points. In one implementation, the central controller provides a pre-allocation list to a wireless client that is requesting pre-allocation. As described in further detail below, in one implementation, the pre-allocation list includes a set of wireless access points that would allow the wireless client to pre-allocate resources. The wireless client may then select one or more of the wireless access points from the pre-allocation list. In another implementation, the central controller provides a pre-allocation policy to the wireless client. As described in further detail below, in one implementation, the pre-allocation policy may include, for example, a maximum number of wireless access points from which the wireless client may pre-allocate resources. By limiting a wireless client's ability to pre-allocate resources, the central controller optimally manages the resources of the wireless network. For example, wireless access points at the edge of the wireless network, currently under heavy loading conditions, may lack sufficient resources to support a given number of wireless clients. Accordingly, the central controller may in various circumstances protect such wireless access points by preventing one or more wireless clients from establishing a pre-allocation with such loaded access points, directing the one or more wireless clients to pre-allocating the resources of alternative wireless access points. In alternative embodiments, the central controller can terminate pre-allocations between a wireless client and one or more wireless access points to enforce pre-allocation policy on the wireless network infrastructure.

B. Exemplary Wireless Network System Architecture

B.1. Network Topology

A network environment including a wireless local area network (WLAN) according to one implementation of the present invention is shown in FIG. 1A. In a specific embodiment of the present invention, the system includes a remote node 20, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between remote node 20 and wireless clients via wireless access points 50. Of course, network 52 can include a variety of network segments, transmission technologies and components, such as terrestrial WAN links, satellite links, and cellular links. LAN 30 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. FIG. 1A illustrates one possible network environment in which the invention may operate; however, other implementations are possible. For example, although remote node 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (not illustrated), as disclosed in U.S. patent application Ser. No. 10/407,584, now U.S. Pat. No. 7,212,837. In addition, the network infrastructure may also include a Wireless LAN Solution Engine (WLSE) offered by Cisco Systems, Inc. of San Jose, Calif. or other wireless network management system. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the present invention.

B.2. Central Controller

FIG. 1B illustrates a central controller 70, which in one implementation, may be used to manage the pre-allocation of resources of the wireless network. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented with a wireless switch, the central controller 70 is operative to communicate with light-weight wireless access points, as disclosed in U.S. patent application Ser. No. 10/407,584, now U.S. Pat. No. 7,212,837. Of course, other control points in the wireless network infrastructure can be used to enforce the pre-allocation policies described herein. For example, enforcement of pre-allocation policy can be executed as distributed tasks implemented by the wireless access points 50.

B.3. Wireless Access Point

FIG. 2 illustrates for didactic purposes a hardware system 300, which can be used to implement a wireless access point 50 of FIGS. 1A and 1B. In one implementation, the hardware system 300 comprises a processor 310, a memory 312, a network interface 314 (e.g., an 802.3 interface) for communication with a LAN, a cache 316 for storing VLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including DHCP clients, Cisco® Discovery Protocol (CDP) modules, wireless access point modules, SNMP functionality, etc.) and device drivers (e.g., network and WLAN interface drivers) stored in persistent memory 318 (e.g., a hard disk drive, flash memory, etc.). At start up, these software components are loaded into system memory 312 and then accessed and executed by processor 310.

B.4. Wireless Client

FIG. 3 illustrates for didactic purposes a hardware system 400, which can be used to implement a wireless client 60 of FIGS. 1A and 1B. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A network/communication interface 424, a system memory 414, and a video memory 416 coupled to bus 406. In turn, a display device 418 couples to video memory 416. A mass storage 420, a keyboard and pointing device 422, and an I/O port 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 400 perform their conventional functions known in the art. In particular, wireless network interface 424 provides communication between hardware system 400 and any of a wide range of wireless networks, such as a WLAN (e.g., IEEE 802.11), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports provide communication between additional peripheral devices, which may couple to hardware system 400.

Hardware system 400 may include a variety of system architectures, and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist with the components of hardware system 400, which couple to the single bus. Furthermore, system 400 may include additional components, such as additional processors, storage devices, or memories.

In one embodiment, the operations of wireless client-side roaming functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in discrete hardware or firmware.

While FIG. 3 illustrates, for didactic purposes, the hardware architecture of a wireless client according to one implementation of the present invention, the present invention, however, can be implemented on a wide variety of computer system architectures, such as dual-mode cellular phones, wireless VoIP phones, Personal Digital Assistants, Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

C. Pre-Allocation Policy Mechanism in Wireless Network Infrastructure

As described above, as a wireless client roams, the wireless client may attempt to pre-allocate resources of one or more wireless access points in the wireless network. In one implementation, the wireless clients and the wireless network infrastructure implement the IEEE 802.11 WLAN standard (including all amendments thereto). Of course, the present invention can be used in connection with other wireless networking protocols. The following describes how the central controller 70 manages the resources of the wireless network by controlling the ability of one or more wireless clients to pre-allocate resources of one or more wireless access points.

C.1. Pre-Allocation Policy in Wireless Network Infrastructure

In one implementation of the present invention, the central controller 70 manages the resources of the wireless network by providing a pre-allocation list to the wireless client that is requesting pre-allocation. As described in further detail below, in one implementation, the pre-allocation list includes a set of wireless access points that are authorized to allow the wireless client to pre-allocate resources. The wireless client may select from the pre-allocation list one or more of the wireless access points. In some of the embodiments described below, the wireless access points 50 transmit to the central controller 70 event or other messages that identify the wireless clients that attempt to or have associated with respective access points. As discussed in more detail below, the central controller 70 may generate pre-allocation lists or policies responsive to the connections or connection attempts of the wireless clients.

FIG. 4A is a flow chart illustrating a process flow, according to one implementation of the present invention, associated with providing a pre-allocation list to a wireless client. Referring to FIGS. 1B and 4A together, after or while a wireless access point (e.g., wireless access point 50a) and a wireless client 60 associate or re-associate (502), the central controller 70, in one implementation, obtains a list of neighboring wireless access points (for example, one or more access points within the RF connectivity of the current access point with which the wireless client is connected) (504). In one implementation, the list of neighboring wireless access points for a given access point may be relatively static, where, for example, the neighbor list is manually configured and updated periodically (e.g., yearly) or upon certain events (e.g., deployment or reconfiguration of wireless access points). In another implementation, the neighbor list may be more dynamic, where, for example, the central controller 70 generates or updates a neighbor list based on receipt and processing of wireless access point-to-wireless access point neighbor messages, as disclosed in U.S. patent application Ser. No. 10/447,735, now U.S. Pat. No. 7,340,247. In another implementation, the central controller 70 generates or updates a neighbor list based on information learned from the wireless client. For example, the wireless client 60 may provide information such as the last wireless access point (e.g., wireless access point 50b) to which the wireless client 60 was previously associated. The wireless client may also transmit a list of wireless access points that it has identified as being neighbors through some other means, such as active or passive scanning as described in 802.11. Such information may be transmitted in a re-association request, or during some other time. The central controller 70 may use this information in assembling a neighbor list corresponding to the newly associated wireless access point.

The central controller 70, in one implementation, selects one or more neighboring wireless access points to create a pre-allocation list and, optionally, one or more pre-allocation parameter(s) (506). For example, the central controller 70 may determine a range of potential pre-allocations for a given wireless client. For example, the range may be from zero pre-allocations to potentially some number of pre-allocations with all wireless access points. The pre-allocation parameters may include the type of pre-allocation (e.g., type of resources to be pre-allocated).

As described above, a pre-allocation list, in one implementation, is a list of wireless access points with which a particular wireless client is authorized to pre-allocate resources. In one implementation, the pre-allocation list includes the service set identifiers (SSIDs) and/or basic service set identifiers (BSSIDs) of the authorized wireless access points. In one implementation, the pre-allocation list may include a set of neighboring wireless access points and a pre-allocation limit indicating a permitted number of concurrent pre-allocations that a wireless client may establish. The central controller 70, in one implementation, stores or generates a pre-allocation list for each wireless client.

The central controller 70 provides pre-allocation data (e.g., an identifier, such as the MAC address of the wireless client and pre-allocation parameters, if any) to the pre-allocation wireless access points 50 (508), which then store the pre-allocation data. Each wireless access points 50, in one implementation, maintains a pre-allocation table storing the MAC addresses of the wireless clients authorized to establish pre-allocations with that wireless access point. As discussed below in connection with FIG. 6, the wireless access points may selectively allow wireless clients to pre-allocate resources based on the state of the pre-allocation table. In one implementation, when the central controller 70 updates the pre-allocation list for a given wireless client, the central controller 70 transmits the updated pre-allocation data to one or more wireless access points 50. In one implementation, each wireless access point 50 updates its stored pre-allocation data, if any, based on messages received from the central controller 70. For example, the central controller 70 may transmit a message causing a recipient wireless access point to delete a wireless client MAC address from its corresponding pre-allocation table. In addition, as FIG. 4A illustrates, in one implementation, the wireless access point (e.g., wireless access point 50a) currently associated with the wireless client 60 transmits the pre-allocation list to the wireless client (510). In one implementation, the pre-allocation list can be included in an Information Element appended to the association response (or re-association response) transmitted by the wireless access point to the wireless client. Of course, the pre-allocation list can be appended to other wireless management frames, or a separate frame entirely.

Other implementations are possible. In another implementation, the central controller 70 can maintain a central pre-allocation table or other data structure, which the wireless access points access to determine whether a pre-allocation request from a given wireless client should be granted. Still further, each wireless access point may be configured to generate or obtain a neighbor list and apply a pre-allocation policy to generate a pre-allocation list for the wireless client. The pre-allocation data can then be broadcast or multicast to the other wireless access points, or transmitted to central controller 70, or alternatively transmitted to a relay device, for distribution to the wireless access points. Using a relay device allows wireless access points to send the pre-allocation data to the relay device. The relay device can then forward the pre-allocation data to the other wireless access points.

FIG. 4B is a flow chart illustrating a process flow, according to one implementation of the present invention, implemented at the wireless client 60. As FIG. 4B shows, after the wireless client (520) associates or re-associates with a wireless access point, the wireless client determines if it has received a pre-allocation list (522). In an alternative implementation, the wireless client may determine if it has received a pre-allocation list, because the wireless access point sent the pre-allocation list asynchronously. If the wireless client determines that it has received a pre-allocation list, the wireless client stores the pre-allocation list (524). Accordingly, as FIG. 4B illustrates, the pre-allocation list may be updated after each roam event.

As a wireless client roams about a wireless environment, the wireless client may establish one or more pre-allocations with selected wireless access points. As discussed below, the pre-allocation list, in one implementation, controls the number and/or identity of the access points with which the wireless client attempts to establish resource pre-allocations. FIG. 4C is a flow chart illustrating a process flow, according to one implementation of the present invention, implemented at the wireless client 60. As FIG. 4C shows, as part of a pre-allocation process, the wireless client searches for, or maintains a list of, visible (i.e., radio frequency (RF) detectable) wireless access points (530). The wireless client then determines if it has a stored pre-allocation list (532). If so, the wireless client then filters the visible wireless access points against the pre-allocation list (534). The wireless client then limits operation of its pre-allocation mechanisms (if any) to the remaining wireless access points (536). As discussed in more detail below, the wireless network infrastructure may implement one or more processes to enforce pre-allocation policy.

C.2. Pre-Allocation Policy

In an alternative embodiment of the present invention, the central controller 70 manages the resources of the wireless network, and enforces pre-allocation policy, by selectively terminating pre-allocations between wireless clients and wireless access points. Optionally, the wireless network infrastructure may provide pre-allocation policy information to the wireless client to allow them to adjust one or more aspects of their pre-allocation mechanisms. As described in further detail below, in one implementation, the pre-allocation policy may include, for example, a maximum number of wireless access points with which the wireless client may pre-allocate resources.

FIG. 5A is a flow chart illustrating a process flow, according to one implementation of the present invention, implemented by the wireless network infrastructure during an association (or re-association) between a given wireless access point 50 and a wireless client 60. Referring to FIGS. 1B and 5A together, after or while the wireless access point 50a associates or re-associates with the wireless client 60 (602), the central controller 70 selects one or more pre-allocation policies and, optionally, a pre-allocation list (604) for the wireless client. The central controller 70 then transmits the pre-allocation policy, and optionally a pre-allocation list if generated, to the wireless client 60 (606). In an alternative embodiment, pre-allocation policy can be advertised by the wireless network infrastructure in beacon or other wireless network management frames.

The pre-allocation policy, in one implementation, is a general policy that is applied to specific wireless clients. In one implementation, the pre-allocation policy may be a maximum number of pre-allocations for a given wireless client. In another implementation, there may be specific policies directed to particular classes of wireless clients (e.g., cell phones versus notebook computers) or directed to particular groups of wireless clients (e.g., wireless clients associated with one department versus wireless clients associated with another department).

If the wireless client receives only a pre-allocation policy, the wireless client may attempt to pre-allocate within the pre-allocation policy (e.g., up to 3 pre-allocations) without restriction as to which wireless access points are permissible. While either the pre-allocation list, described above, or the pre-allocation policy may be applied alone, both the pre-allocation list and the pre-allocation policy may be applied together. For example, the wireless client may pre-allocate resources from up to 3 wireless access points, for example, according to a pre-allocation policy. If a pre-allocation list is also applied, those 3 wireless access points may be limited to 3 wireless access points identified in the pre-allocation list.

FIG. 5B is a flow chart illustrating a process flow, according to one implementation of the present invention, implemented by the central controller 70 to enforce a pre-allocation policy. In one implementation, the wireless access points are configured to transmit messages to central controller 70 when a wireless client transmits pre-allocation requests, or upon completion of a pre-allocation with a wireless client. As FIG. 5B shows, when the central controller 70 receives a pre-allocation event message from a wireless access point (620), the central controller 70 stores the pre-allocation event (622) to track the number of pre-allocations the wireless client has established with one or more wireless access points in the wireless network infrastructure. For example, after a pre-allocation event (620), the central controller 70 may generate a time stamp upon receipt of the pre-allocation event message and store the MAC address of the transmitting wireless access point, and the MAC address of the wireless client identified in the pre-allocation event message. Alternatively, the wireless access points may time stamp the pre-allocation event messages. As FIG. 5B illustrates, the central controller 70 then determines if the current number of pre-allocations corresponding to the wireless client is within the policy limit (624). If the current number of pre-allocations is not within the policy limit, the central controller 70, in one implementation, transmits a message to the wireless access point holding the oldest pre-allocation for the identified wireless client (e.g., the wireless access point with the oldest time stamp that identifies the wireless client) causing the wireless access point to terminate the pre-allocation with the identified wireless client (626). Accordingly, pre-allocation policy can be achieved without modifications to the wireless client and/or the wireless access point. That is, as the wireless client establishes pre-allocations with a wireless access point, the central controller 70 selectively terminates existing pre-allocations to keep the number of pre-allocations corresponding to a wireless client within defined pre-allocation policy limits. In such an implementation, the wireless access points can be configured to accept all pre-allocation requests subject to local resource limitations or other policy limits.

As discussed above, in one implementation, the pre-allocation policy is provided to the wireless client, as it may be configured to apply the policy in its pre-allocation processes. FIG. 5C is a flow chart illustrating a process flow, according to one implementation of the present invention, implemented at the wireless client 60. Similar to the process flow of FIG. 4C, as FIG. 5C shows, after the wireless client associates or re-associates with a wireless access point (630), the wireless client determines if it has received a pre-allocation policy (632). If so, the wireless client stores the pre-allocation policy (634).

FIG. 5D is a flow chart illustrating a process flow, according to one implementation of the present invention, implemented at the wireless client 60. As FIG. 5D shows, as part of its pre-allocation processes, the wireless client continues to search for, and maintains a list of, visible wireless access points (640). The wireless client determines if it has a stored pre-allocation policy (642), and if so, the wireless client filters the visible wireless access points against the pre-allocation policy (644). The wireless client then establishes one or more pre-allocations (646) by selecting one or more wireless access points in a manner consistent with the pre-allocation policy.

D. Pre-Allocation Enforcement by a Wireless Access Point

The description above describes how a wireless access point may use a pre-allocation list or a pre-allocation policy to determine or limit which wireless clients may establish pre-allocations. The following description describes how the wireless access points enforce pre-allocation policy against wireless clients, such as a rogue wireless client (or a wireless client that is not configured to implement pre-allocation policy), that may ignore the pre-allocation list and pre-allocation policy.

FIG. 6 is a flow chart illustrating a process flow, according to one implementation of the present invention, implemented at a wireless access point. The wireless access point optionally receives a pre-allocation request from the wireless client (702) and optionally scans a pre-allocation table to determine if the wireless client is a permitted wireless client (704). In one implementation, a "permitted" wireless client is a wireless client that is permitted to request a pre-allocation. Identifying a wireless client as a permitted wireless client is optional, and the means for determining whether a wireless client is permitted or not permitted may depend on the specific application or according to some general policy. If the wireless client is permitted to request a pre-allocation, the wireless access point allows the request (706) and transmits a positive pre-allocation response to the wireless client (708). The wireless access point then reports the pre-allocation event to the central controller (710). If the wireless client is not a permitted wireless client (704), the wireless access point increments a no permission counter (712), transmits a failure or deny response to the wireless client (714), and transmits a no permission report to the central controller (716). As discussed below, the central controller 70 can use the information in the pre-allocation event messages to adjust pre-allocation policy, generally or specific to a particular wireless client, based on one or more observed events.

E. Pre-Allocation Enforcement by the Central Controller

FIG. 7 is a flow chart illustrating a process flow, according to one implementation of the present invention, implemented at the central controller 70. As FIG. 7 illustrates, the central controller 70 monitors the pre-allocation activity of one or more wireless clients and applies one or more policies upon a detected event. In one implementation, the central controller is operative to disallow all pre-allocations to a wireless client that continually ignores the pre-allocation policy provided to it. As FIG. 7 shows, if the central controller receives a no permission report from a wireless access point (802) (see FIG. 6), the central controller determines if the wireless client has already been blacklisted (804). If not, the central controller increments an attempt counter for the wireless client (806). In one implementation, each attempt may result in incrementing the attempt counter. In another implementation, several attempts to pre-allocate with the resources of several wireless access points within a certain amount of time (e.g., within 1 second) may count as only one attempt and would thus result in only one increment of the attempt counter. The central controller 70 then determines if the number of pre-allocation attempts has exceeded a threshold number (e.g., 3 attempts) (808). If the wireless client has already been blacklisted (804) or if the number of pre-allocation attempts has exceeded a threshold number (808), the central controller may apply one or more policies in connection with the wireless client (810). For example, if the wireless client attempts to pre-allocate to a particular wireless access point that is not on the pre-allocation list, the pre-allocation will be disregarded. However, if the wireless client attempts to pre-allocate too many times (i.e., exceeds the threshold), the central controller may blacklist or further reject any pre-allocations from the wireless client even with those wireless access points in the previously provided pre-allocation list. In addition, if a wireless client on the blacklist continues to attempt pre-allocations, other policies (e.g., denying network access entirely) can be applied.

By limiting a wireless client's ability to pre-allocate resources, the central controller 70 may manage the resources of the wireless network infrastructure. For example, wireless access points at the edge of the wireless network have only limited resources to support a given number of wireless clients. Accordingly, the central controller may in various circumstances protect wireless access points experiencing heavy load by allowing pre-allocations with alternative wireless access points experiencing lighter load conditions.

The present invention has been explained with reference to specific embodiments. For example, while embodiments of the present invention have been described as operating in connection with IEEE 802.11 networks, the present invention can be used in connection with any WLAN environment. Furthermore, the embodiments of the present invention described above may be applied to various types of pre-allocation or reservation schemes such as over-the-air protocols and over-the-wire protocols disclosed in the 802.11r draft standard. In other implementations, the pre-allocation policy functions can be implemented in connection with any suitable protocol or standard. Other embodiments will be evident to those of ordinary skill in the art. It is therefore not intended that the present invention be limited except as indicated by the appended claims.

What is claimed is:

1. In a wireless network comprising a plurality of wireless access points operative to pre-allocate resources to one or more requesting wireless clients, a method comprising:
   monitoring pre-allocation activity corresponding to a wireless client as the wireless client roams within a wireless network environment comprising a plurality of wireless access points, wherein the pre-allocation activity comprises the attempted pre-allocation of wireless resources of one or more of the plurality of wireless access points by the one or more wireless clients; and
   applying a pre-allocation policy operative to limit a total number of pre-allocations between the wireless client and one or more of the plurality of wireless access points.

2. An apparatus operative in a wireless network comprising a plurality of wireless access points operative to pre-allocate resources to one or more requesting wireless clients, the apparatus comprising:
   one or more processors;
   a memory;
   a network interface;
   computer program code, physically stored in the memory, comprising computer-readable instructions operable to cause the one or more processors and the apparatus to
   monitor pre-allocation activity corresponding to a wireless client as the wireless client roams within a wireless network environment comprising a plurality of wireless access points, wherein the pre-allocation activity comprises the attempted pre-allocation of wireless resources of one or more of the plurality of wireless access points by the one or more wireless clients; and
   apply a pre-allocation policy operative to limit a total number of pre-allocations between the wireless client and one or more of the plurality of wireless access points.

3. An apparatus operative in a wireless network comprising a plurality of wireless access points operative to pre-allocate resources to one or more requesting wireless clients, the wireless network comprising:
   means for monitoring pre-allocation activity corresponding to a wireless client as the wireless client roams within a wireless network environment comprising a plurality of wireless access points, wherein the pre-allocation activity comprises the attempted pre-allocation of wireless resources of one or more of the plurality of wireless access points by the one or more wireless clients; and
   means for applying a pre-allocation policy operative to limit a total number of pre-allocations between the wireless client and one or more of the plurality of wireless access points.

4. In a wireless access node of a wireless network comprising one or more wireless access points operative to conditionally pre-allocate resources to one or more wireless clients, a method comprising:
   receiving a wireless client identifier corresponding to a wireless client accessing the wireless network through a first wireless access point, the wireless network including the first wireless access point and a plurality of additional wireless access points;
   generating a pre-allocation policy for the wireless client, wherein the pre-allocation policy establishes a limit on a total number of pre-allocations between the wireless client and one or more of the plurality of additional wireless access points; and
   transmitting the pre-allocation policy to the wireless client.

5. The method of claim 4 further comprising
   configuring one or more wireless access points to enforce the pre-allocation policy.

6. The method of claim 4 wherein the generating a pre-allocation policy comprises
   obtaining a list of neighboring wireless access points corresponding to the first wireless access point; and
   selecting one or more neighboring wireless access points from the list of neighboring wireless access points to create a pre-allocation list.

7. The method of claim 4 further comprising
   providing pre-allocation data to the neighboring wireless access points selected for the pre-allocation list.

8. The method of claim 6 wherein the pre-allocation list is transmitted to the wireless client.

9. A wireless access node of a wireless network comprising one or more wireless access points operative to conditionally pre-allocate resources to one or more wireless clients, the wireless access node comprising:
- one or more processors;
- a memory;
- a network interface;
- a wireless access point application, physically stored in the memory, comprising instructions operable to cause the one or more processors and the wireless access point to
- receive a wireless client identifier corresponding to a wireless client accessing the wireless network through a first wireless access point, the wireless network including the first wireless access point and a plurality of additional wireless access points;
- generate a pre-allocation policy for the wireless client, wherein the pre-allocation policy establishes a limit on a total number of pre-allocations between the wireless client and one or more of the plurality of additional wireless access points; and
- transmit the pre-allocation policy to the wireless client.

10. A wireless access node of a wireless network comprising one or more wireless access points operative to conditionally pre-allocate resources to one or more wireless clients, the wireless access node comprising:
- means for receiving a wireless client identifier corresponding to a wireless client accessing the wireless network through a first wireless access point, the wireless network including the first wireless access point and a plurality of additional wireless access points;
- means for generating a pre-allocation policy for the wireless client, wherein the pre-allocation policy establishes a limit on a total number of pre-allocations between the wireless client and one or more of the plurality of additional wireless access points; and
- means for transmitting the pre-allocation policy to the wireless client.

11. In a wireless management node of a wireless network comprising one or more wireless access points operative to pre-allocate resources to one or more wireless clients, a method comprising
- receiving a pre-allocation event message from a first wireless access point, wherein the pre-allocation event message includes a wireless client identifier corresponding to a wireless client and the first wireless access point, wherein the wireless client is associated with a second wireless access point, and wherein the pre-allocation event message corresponds to a pre-allocation of wireless resources of the first wireless access point by the wireless client;
- tracking the total number of pre-allocations between the wireless client and one or more wireless access points in a wireless network; and
- causing a selected wireless access point to terminate a pre-allocation between the wireless client and the selected wireless access point if the total number of pre-allocations exceeds a pre-allocation limit.

12. The method of claim 11 wherein tracking the number of pre-allocations comprises
- storing the wireless client identifier in association with the wireless access point in a pre-allocation data structure.

13. The method of claim 12 wherein the wireless client identifier and the wireless client are stored with a corresponding time stamp.

14. The method of claim 13 wherein the selected wireless access point is selected based on the wireless client identifier and the time stamp stored in the pre-allocation data structure.

15. The method of claim 14 further comprising:
- if the wireless client is not a permitted wireless client, transmitting a failure response to the wireless client; and
- transmitting a report to a central wireless network management node.

16. A wireless management node of a wireless network comprising one or more wireless access points operative to pre-allocate resources to one or more wireless clients, the wireless network server comprising:
- one or more processors;
- a memory;
- a network interface;
- a management application, physically stored in the memory, comprising instructions operable to cause the one or more processors and the wireless network server to
- receive a pre-allocation event message from a first wireless access point, wherein the pre-allocation event message includes a wireless client identifier corresponding to a wireless client and the first wireless access point, wherein the wireless client is associated with a second wireless access point, and wherein the pre-allocation event message corresponds to a pre-allocation of wireless resources of the first wireless access point by the wireless client;
- track the total number of pre-allocations between the wireless client and one or more wireless access points in a wireless network; and
- cause a selected wireless access point to terminate a pre-allocation between the wireless client and the selected wireless access point if the total number of pre-allocations exceeds a pre-allocation limit.

17. The wireless management node of claim 16 wherein the management application further comprises instructions operable to cause the one or more processors and the wireless network server to
- obtain a list of neighboring wireless access points corresponding to the first wireless access point; and
- select one or more neighboring wireless access points from the list of neighboring wireless access points to create a pre-allocation list.

18. The wireless management node of claim 16 wherein the management application further comprises instructions operable to cause the one or more processors and the wireless network server to
- providing pre-allocation data to the neighboring wireless access points selected for the pre-allocation list.

19. The wireless management node of claim 16 wherein the pre-allocation list is transmitted to the wireless client.

20. A wireless management node of a wireless network comprising one or more wireless access points operative to pre-allocate resources to one or more wireless clients, the wireless network server comprising:
- means for receiving a pre-allocation event message from a first wireless access point, wherein the pre-allocation event message includes a wireless client identifier corresponding to a wireless client and the first wireless access point, wherein the wireless client is associated with a second wireless access point, and wherein the pre-allocation event message corresponds to a pre-allocation of wireless resources of the first wireless access point by the wireless client;
- means for tracking the total number of pre-allocations between the wireless client and one or more wireless access points in a wireless network; and
- means for causing a selected wireless access point to terminate a pre-allocation between the wireless client and the selected wireless access point if the total number of pre-allocations exceeds a pre-allocation limit.

21. In a wireless access point operative to associate with one or more wireless clients in a wireless network and operative to conditionally allocate resources for one or more wireless clients, a method comprising:
    receiving, at a first wireless access point, information from a remote node indicating permission for identified wireless clients to establish pre-allocations of wireless resources of the first wireless access point;
    receiving, at the first wireless access point, a pre-allocation request from a wireless client currently associated with a second wireless access point;
    accessing the information to determine if the wireless client is a permitted wireless client;
    establishing a pre-allocation with the wireless client to reserve wireless resources for use if the wireless client roams away from the second wireless access point and establishes an association with the first wireless access point, if the wireless client is a permitted wireless client; and
    transmitting a response to the wireless client.

22. The method of claim 21 further comprising
    reporting the pre-allocation to a central wireless network management node.

23. A wireless access point operative to associate with one or more wireless clients in a wireless network and operative to conditionally allocate resources for one or more wireless clients, the wireless access point comprising:
    one or more processors;
    a memory;
    a wireless network interface;
    a wireless access point application, physically stored in the memory, comprising instructions operable to cause the one or more processors and the wireless access point to
    receive information from a remote node indicating permission for identified wireless clients to establish pre-allocations of wireless resources of the first wireless access point;
    receive a pre-allocation request from a wireless client currently associated with a second wireless access point;
    access the information to determine if the wireless client is a permitted wireless client;
    establish a pre-allocation with the wireless client to reserve wireless resources for use if the wireless client roams away from the second wireless access point and establishes an association, if the wireless client is a permitted wireless client; and
    transmit a response to the wireless client.

24. The wireless access point of claim 23 wherein the wireless access point application further comprises instructions operable to cause the one or more processors and the wireless access point to
    report the pre-allocation to a central wireless network management node.

25. A wireless access point operative to associate with one or more wireless clients in a wireless network and operative to conditionally allocate resources for one or more wireless clients, the wireless access point comprising:
    means for receiving, at a first wireless access point, information from a remote node indicating permission for identified wireless clients to establish pre-allocations of wireless resources of the first wireless access point;
    means for receiving a pre-allocation request from a wireless client currently associated with a second wireless access point;
    means for access the information to determine if the wireless client is a permitted wireless client;
    means for establishing a pre-allocation with the wireless client to reserve wireless resources for use if the wireless client roams away from the second wireless access point and establishes an association, if the wireless client is a permitted wireless client; and
    means for transmitting a response to the wireless client.

26. In a wireless client operative to associate with a wireless access point in a wireless network and operative to reserve resources with at least one other wireless access point, a method comprising:
    associating with a first wireless access point;
    storing a pre-allocation policy if the pre-allocation policy is received from the first wireless access point; and
    applying the pre-allocation policy by limiting, in a manner consistent with the pre-allocation policy, transmission of pre-allocation requests to one or more wireless access points that neighbor the first wireless access point, wherein the pre-allocation requests request pre-allocation of wireless resources for use if the wireless client roams away from the first wireless access point.

27. The method of claim 26 wherein the pre-allocation policy is a pre-allocation list identifying one or more wireless access points.

28. The method of claim 26 further comprising:
    scanning for neighboring wireless access points;
    determining if a pre-allocation list is stored; and
    limiting the transmission of pre-allocation requests to the neighboring access points that are identified in the pre-allocation list.

29. A wireless client operative to associate with a wireless access point in a wireless network and operative to reserve resources with at least one other wireless access point, the wireless client comprising:
    one or more processors;
    a memory;
    a network interface;
    a wireless network driver application, physically stored in the memory, comprising instructions operable to cause the one or more processors and the apparatus to
    associate with a first wireless access point;
    store a pre-allocation policy if the pre-allocation policy is received from the first wireless access point; and
    apply the pre-allocation policy by limiting, in a manner consistent with the pre-allocation policy, transmission of pre-allocation requests to one or more wireless access points that neighbor the first wireless access point, wherein the pre-allocation requests request pre-allocation of wireless resources for use if the wireless client roams away from the first wireless access point.

30. The wireless client of claim 29 wherein the pre-allocation policy is a pre-allocation list identifying one or more wireless access points.

31. The wireless client of claim 29 wherein the wireless network driver application further comprises instructions operable to cause the one or more processors and the wireless access point to
    scan for neighboring wireless access points;
    determine if a pre-allocation list is stored; and
    limit the transmission of pre-allocation requests to the neighboring access points that are identified in the pre-allocation list.

32. A wireless client operative to associate with a wireless access point in a wireless network and operative to reserve resources with at least one other wireless access point, the wireless client comprising:

means for associating with a first wireless access point;

means for storing a pre-allocation policy if the pre-allocation policy is received from the first wireless access point; and means for applying the pre-allocation policy by limiting, in a manner consistent with the pre-allocation policy, transmission of pre-allocation requests to one or more wireless access points that neighbor the first wireless access point, wherein the pre-allocation requests request pre-allocation of wireless resources for use if the wireless client roams away from the first wireless access point.

* * * * *

UNITED STATES PATENT AND TRADEMARK OFFICE
CERTIFICATE OF CORRECTION

PATENT NO. : 7,602,746 B2  Page 1 of 1
APPLICATION NO. : 11/315861
DATED : October 13, 2009
INVENTOR(S) : Calhoun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this

Fifth Day of October, 2010

David J. Kappos
*Director of the United States Patent and Trademark Office*